(12) United States Patent
Rickett (10) Patent No.: US 7,376,517 B2
(45) Date of Patent: May 20, 2008

(54) METHOD FOR ESTIMATION OF INTERVAL SEISMIC QUALITY FACTOR

(75) Inventor: James E. Rickett, Oakland, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 35 days.

(21) Appl. No.: 11/432,804

(22) Filed: May 12, 2006

(65) Prior Publication Data

US 2006/0265132 A1    Nov. 23, 2006

Related U.S. Application Data

(60) Provisional application No. 60/680,904, filed on May 13, 2005.

(51) Int. Cl.
    *G01V 1/28* (2006.01)
(52) U.S. Cl. ......................................................... 702/17
(58) Field of Classification Search ................... 702/14, 702/17, 18, 6
    See application file for complete search history.

(56) References Cited

U.S. PATENT DOCUMENTS

| 5,555,218 | A  | 9/1996  | Chambers et al. |
| 5,574,674 | A  | 11/1996 | Pan |
| 5,724,309 | A  | 3/1998  | Higgs et al. |
| 5,917,738 | A  | 6/1999  | Pan |
| 6,931,324 | B2 | 8/2005  | Taner et al. |
| 7,088,639 | B2 | 8/2006  | Walls et al. |
| 2004/0122596 | A1 | 6/2004 | Sudhakar et al. |
| 2005/0157589 | A1 | 7/2005 | Laake |
| 2006/0104158 | A1 | 5/2006 | Walls et al. |
| 2006/0203613 | A1 | 9/2006 | Thomsen et al. |

FOREIGN PATENT DOCUMENTS

| WO | WO/2006/025823 A1 | 8/2004 |
| WO | WO/2006/025824 A1 | 8/2004 |

OTHER PUBLICATIONS

Kjartansson, Constant Q-Wave Propagation and Attenuation, Journal of Geophysical Research, 1979, vol. 84, pp. 4737-4748.
Lancaster et al., P0004 High Density 3D Pre-Stack Q Estimation, Jun. 7-10, 2004, EAGE 66$^{th}$ Conference & Exhibition, Expanded Abstracts, Paris, France.

(Continued)

*Primary Examiner*—Donald E McElheny, Jr.
(74) *Attorney, Agent, or Firm*—Richard J. Schulte; Maurice E. Teiveira (57) ABSTRACT

The present invention includes a method for determining interval values of seismic quality factor, Q, from seismic data. Seismic data is recorded and preprocessed as necessary. Estimates of amplitude spectra are determined from the seismic data. Logarithms are taken of the amplitude spectra and weights derived from the amplitude spectra. Interval values of seismic quality factor, Q, are determined by performing a weighted fit to the log-amplitude spectra with a function that is parameterized by an initial wavelet, an attenuation profile (1/Q) and an absolute-scaling profile.

17 Claims, 7 Drawing Sheets

OTHER PUBLICATIONS

Taner et al., A Robust Method for Q Estimation, 73rd Annual International Meeting Soc. Expl. Geophys., Expanded Abstracts, 2003, pp. 710-713.

Adriansyah et al., Effects of attenuation and scattering on AVO measurements, Geophysics, Nov.-Dec. 1998, pp. 2025-2034, vol. 63, No. 6, Society of Exploration Geophysicists.

Cai et al., 2-D ray-based tomography for velocity, layer shape, and attenuation from GPR data, Geophysics, Sep.-Oct. 1999, pp. 1579-1593, vol. 64, No. 5, Society of Exploration Geophysicists.

Dasgupta et al., Estimation of Q from surface seismic reflection data, Geophysics, Nov.-Dec. 1998, pp. 2120-2128, vol. 63, No. 6, Society of Exploration Geophysicists.

De et al., Comparison of $P$- and $S$-wave velocities and Q's from VSP and sonic log data, Geophysics, Oct. 1994, pp. 1512-1529, vol. 59, No. 10, Society of Exploration Geophysicists.

Grossman et al., Constant-Q wavelet estimation via a nonstationary Gabor spectral model, Crewes Research Report, University of Calgary, 2001, pp. 223-240, vol. 13.

Grossman et al., A robust algorithm for constant-Q wavelet estimation using Gabor analysis, Oct. 6-11, 2002, Society of Exploration Geophysicists International Exposition and 72nd Annual Meeting, Expanded Abstracts, Salt Lake City, Utah.

Harris et al., Multichannel estimation of frequency-dependent $Q$ from VSP data[1], Geophysical Prospecting, 1997, pp. 87-109, vol. 45, No. 1, European Association of Geoscientists & Engineers.

Jeng et al., An improved method of determining near-surface $Q$, Geophysics, Sep.-Oct. 1999, pp. 1608-1617, vol. 64, No. 5, Society of Exploration Geophysicists.

Leaney et al., Walkaway Q inversion, 69th Annual International Meeting, Society of Exploration Geophysicists, 1999 Expanded Abstracts, 1999, pp. 1311-1314.

Margrave et al., Gabor Deconvolution Revisited, 73rd Annual International Meeting, Society of Exploration Geophysicists, Expanded Abstracts, 2003, pp. 714-717.

Mateeva, Quantifying the uncertainties in absorption estimates from VSP spectral ratios, pp. 1-14, Center for Wave Phenomena—Report 457, Colorado School of Mines, no date supplied.

Mosegaard et al., Probabilistic Approach to Inverse Problems, International Handbook of Earthquake and Engineering Seismology, Academic Press 2002, pp. 237-265, vol. 81A, ISBN 0-12-440652-1, International Association Seismol. & Phys. Earth's Interior.

Neep et al., Measurement of seismic attenuation from high-resolution crosshole data, Geophysics, Jul.-Aug. 1996, pp. 1175-1188, vol. 61, No. 4, Society of Exploration Geophysicists.

Quan et al., Seismic attenuation tomography using the frequency shift method, Geophyisics, May-Jun. 1997, pp. 895-905, vol. 62, No. 3, Society of Exploration Geophysicists.

Raikes et al., Measurements of Earth Attenuation from Downhole and Surface Seismic Recordings, Geophysical Prospecting, 1984, pp. 892-919, vol. 32.

Ribodetti et al., Asymptotic theory for imaging the attenuation factor $Q$, Geophysics, Sep.-Oct. 1998, pp. 1767-1778, vol. 63, No. 5, Society of Exploration Geophysicists.

Tonn, The Determination of the Seismic Quality Factor $Q$ from VSP Data: A Comparison of Different Computational Methods[1], Geophysical Prospecting, 1991, pp. 1-27, vol. 39.

Vasco et al., A simultaneous inversion of seismic traveltimes and amplitudes for velocity and attenuation, Geophysics, Nov.-Dec. 1996, pp. 1738-1757, vol. 61, No. 6, Society of Exploration Geophysicists.

White, The accuracy of estimating $Q$ from seismic data, Geophysics, Nov. 1992, pp. 1508-1511, vol. 57, No. 11, Society of Exploration Geophysicists.

Zhang et al., Estimation of quality factors from CMP records, Geophysics, Sep.-Oct. 2002, pp. 1542-1547, vol. 67, No. 5, Society of Exploration Geophysicists.

METHOD FOR ESTIMATION OF INTERVAL SEISMIC QUALITY FACTOR

This application claims the benefit under 35 USC 119 of Provisional Application No. 60/680,904, filed May 13, 2005.

FIELD OF THE INVENTION

The present invention relates generally to seismic analysis of subterranean formations, and more particularly, to the determination of interval values of the seismic quality factor, Q.

BACKGROUND OF THE INVENTION

Deepwater reservoirs containing hydrocarbons often have complex internal stratigraphy that needs to be understood prior to field development. For this reason high-resolution target-oriented seismic surveys are sometimes acquired prior to finalizing deepwater oil and gas-field development plans. However, as acquisition technology and imaging algorithms improve, the ultimate resolution may become limited by the low-pass filtering effects of the earth from seismic attenuation. Seismic attenuation is the frequency-dependent reduction in amplitude or energy in a seismic wave as the wave passes farther away from a source due to microscopic frictional forces and scattering from thin layers. It is often described in terms of a seismic quality factor, Q. Seismic attenuation is affected by fluid saturations, clay content and thin-layering. There is a danger that if sufficient attenuation occurs, the additional uplift provided by expensive increased spatial sampling of seismic data will be minimal.

Seismic quality factor, Q, estimates are valuable for seismic imaging, processing, and reservoir characterization applications. Examples of such applications include amplitude and phase compensation, wavelet processing, acquisition design, and lithology/fluid identification. Furthermore, unlike many other seismic attributes, seismic attenuation may be directly related to permeability (via a squirt flow mechanism, for example). By combining rock physics models with recent advances in time-frequency analysis, links can be made between estimated seismic quality factors and key reservoir parameters.

The classic method for estimating the effective attenuation between two seismic waveforms is the spectral ratio method. In this approach, the log of the ratio between two amplitude spectra is computed as function of frequency, and the slope of a best-fit line is related to 1/Q. White, R. E., The accuracy of estimating Q from seismic data: Geophysics, 57, no. 11, 1508-1511, (1992) describes fundamental limitations in resolution with this method. White concludes that although the errors may be reasonable for VSP (Vertical Seismic Profiles) and well-tied surface seismic data, the variance of errors when Q is estimated from surface seismic data will never be less than about 50%.

Grossman et al., J., Lamoureux, M., Aggarwala, R., and Margrave, G., A robust algorithm for constant-Q wavelet estimation using Gabor analysis: $72^{nd}$ Ann. Internat. Mtg., Soc. Expl. Geophys., Expanded Abstracts, (2002) and Margrave, G., Henley, D., Lamoureux, M., Iliescu, V., and Grossman, J., Gabor deconvolution revisited: $73^{rd}$ Ann. Internat. Mtg., Soc. Expl. Geophys., Expanded Abstracts, 714-717 (2003), estimate Q with a technique based on the Gabor-transform. While seeking a global solution that is consistent with a single effective waveform, their technique has the disadvantages that it only works for a single, depth-independent Q value. Furthermore, this method is sensitive to the absolute scaling of the waveforms. Quan, Y., and Harris, J. M., Seismic attenuation tomography using the frequency shift method: Geophysics, 62, no. 3, 895-905 (1997), developed a tomographic technique that uses the shift in central frequency of seismic waveforms to infer interval attenuation. While their approach has the advantage that it is insensitive to absolute scaling, the approach relies on simplifying assumptions about the spectra of the input waveforms. This is a disadvantage because seismic waveforms are never simple, and the effects of attenuation are most significant and visible at the high frequencies.

Therefore, there is a need for a method to determine estimates of seismic quality factors, Q, which are insensitive to absolute scaling and utilize the entire bandwidth of the seismic signal. The present invention addresses this need.

SUMMARY OF THE INVENTION

The present invention includes a method for determining interval values of seismic quality factor, Q, from seismic data. Seismic data is recorded and preprocessed as necessary. Estimates of amplitude spectra are determined from the seismic data. Logarithms are taken of the amplitude spectra and weights derived from the amplitude spectra. Interval values of seismic quality factor, Q, are determined by performing a weighted fit to a log-amplitude surface with a function that is parameterized by an initial wavelet, an attenuation (1/Q) profile and an absolute-scaling profile.

The method can be used for determining interval values of seismic quality factor Q. The method comprising the following steps. Vertical seismic profile (VSP) data is recorded which includes at least three traces at different receiver depths. The VSP data is preprocessed and to isolate a waveform of a wave mode of interest at different receiver depths. At least three temporal amplitude spectra are estimated from the windowed at least three traces, i.e., by discrete Fourier transform technique, multi-window technique, maximum entropy techniques, etc.

Logarithms are taken of the at least three amplitude spectra to produce at least three log-amplitude spectra. Weights are derived from the at least three amplitude spectra. Then interval values of seismic quality factor Q are determined by performing a weighted fit to the at least three log-amplitude spectra with a function that is parameterized by an initial wavelet, an attenuation (1/Q) profile, and an absolute-scaling profile.

Also, a method for determining interval values of seismic quality factor, Q, from surface reflection seismic data is taught. Reflection seismic data is recorded which includes a number of traces. The reflection seismic data is preprocessed to get enhanced reflection seismic data. Amplitude spectra are estimated via time-frequency analysis methods at at least three depths (i.e. via a wavelet technique or a windowed FFT technique for the plurality of traces.)) Logarithms are taken of amplitude spectra to get log-amplitude spectra. Weights are derived from the amplitude spectra. A weighted fit is performed on the log-amplitude spectra with a function that is parameterized by initial wavelets, an attenuation (1/Q) profile, and an absolute-scaling profile to arrive at interval values of seismic quality factor, Q.

It is one object of the present invention to provide a method for estimating the seismic quality factor, Q, from vertical seismic profiles (VSPs) or seismic reflection data by fitting a surface (or hyper-surface) to many log-spectral estimates simultaneously, where the log-spectral estimates come from different depths (and possibly spatial locations), and the fitting surface is parameterized by an initial wavelet (function of frequency and possibly space and offset/angle), a 1/Q attenuation profile (function of depth and possibly space and offset/angle), and a profile that captures the absolute scaling of the waveforms (function of depth and possibly space and offset/angle).

The present invention further includes a program storage device readable by a machine, tangibly embodying a program of instructions executable by the machine to perform the above described methods for providing estimations of interval seismic quality factor, Q.

BRIEF DESCRIPTION OF THE DRAWINGS

These and other objects, features and advantages of the present invention will become better understood with regard to the following description, pending claims and accompanying drawings where:

DETAILED DESCRIPTION OF INVENTION

I. Introduction

The present invention includes an algorithm for the estimation of interval values of seismic quality factor, Q, which is made from a set of seismic wavelets as an inversion of their log-amplitude spectra. An initial wavelet and a set of depth-varying scalars are estimated simultaneously with a Q profile of the area through which a wave has propagated. A weighted least-square formulation means results from the algorithm are not biased by incoherent and noisy spectral components. Test data illustrate the trade-off between vertical resolution and sensitivity to noise. The approach outlined here solves simultaneously for a single wavelet and an interval-Q model that satisfies an entire depth-variable amplitude spectrogram. This method can be regarded as a tomographic generalization of the spectral ratio method. However, rather than fitting a line to the log of the spectral ratio, the method fits a surface to the log-amplitude spectra themselves. In general, the technique makes no assumption about the underlying waveform, and is not sensitive to the absolute scaling; however, if the scaling of the spectral estimates is judged to be reliable, this provides additional constraints. Information from different frequencies is balanced based on the underlying signal-to-noise.

II. Theory: Q—Estimation from Amplitude Spectra

As a wave propagates in the earth, its amplitude is attenuated. For propagation through a layer of thickness $\Delta z$ the output wavelet can be modeled from the input wavelet by:

$$\alpha(\omega, z+\Delta z) = \alpha(\omega, z)e^{-\alpha(\omega, z)\Delta z} \quad (1)$$

where a represents the amplitude spectra of the waveform at different propagation depths (z), $\omega=2\pi f$ and is the angular frequency of the wavelet with f being the temporal frequency, and $\alpha(\omega, z)$ is the effective attenuation in the interval between z and $z+\Delta z$. Unfortunately, the actual amplitude spectra that are estimated are scaled by various phenomena such as geometric spreading or transmission/reflection loss that can be difficult to compensate for accurately. This phenomenon can be included in the modeling process described by equation (1) by working with a scaled amplitude: $A(\omega, z)=\alpha(\omega, z)e^{\beta(z)}$ where $\beta(z)$ represents log-amplitude scale factors.

The partitioning between the scaled amplitudes $\alpha(\omega, z)$ and scaling term $e^{\beta(z)}$ can be controlled by defining $\beta=0$ at a reference depth, $z_0$, so that $A(\omega, z_0)=\alpha(\omega, z_0)$. The modeling process for describing the attenuation of seismic amplitudes then becomes:

$$A(\omega, z+\Delta z) = A(\omega, z)e^{\beta(z+\Delta z)-\beta(z)}e^{-\alpha(\omega,z)\Delta z} \quad (2)$$

After taking logarithms and substituting $B=\log A$, in the limit of small $\Delta z$, this becomes:

$$\frac{dB(\omega, z)}{dz} = \frac{d\beta(z)}{dz} - \alpha(\omega, z). \quad (3)$$

Integrating this equation from depth $z_0$ to z gives an equation for modeling log-amplitude spectra:

$$B(\omega, z) = B_0(\omega) + \beta(z) - \int_{z_0}^{z} \alpha(\omega, z')dz' \quad (4)$$

where $B_0(\omega)=B(\omega, z_0)$, and z' is the variable of integration.

For the levels of attenuation typically observed in rocks, the seismic quality factor, Q, is related to attenuation by:

$$\alpha = \frac{\omega}{2cQ} \quad (5)$$

where c is the seismic phase velocity. Neglecting velocity dispersion, the traveltime depth $\tau(z)$ can be defined through the differential relationship, $d\tau/dz=1/c$, with initial condition, $\tau(z_0)=\tau_0$. Changing the variable of integration allows c to be removed from the equation, so that:

$$B(\omega, \tau) = B_0(\omega) + \beta(\tau) - \omega \int_{\tau_0}^{\tau} \frac{d\tau'}{2Q(\omega, \tau')}. \quad (6)$$

In physical terms, equation (6) says that the observed log-amplitudes can be modeled with an initial log-amplitude spectrum, a depth-variable log-amplitude scalar, and the effect of seismic attenuation.

To derive the traditional spectral ratio approach for Q estimation, the case can be considered when there are only two spectral estimates, $A_0(\omega)$ and $A_1(\omega)$, at traveltime depths $\tau_0$ and $\tau_1$. Equation (6) then simplifies to give:

$$\log\left[\frac{A_1(\omega)}{A_o(\omega)}\right] = \beta - \frac{\omega\Delta\tau}{2Q} \quad (7)$$

where $\Delta\tau = \tau_1 - \tau_0$. The gradient of a linear regression of the log of the amplitude ratio vs $\omega$ is therefore proportional to $\Delta\tau/Q$.

Equation (6) can also be considered in a broader sense: given a model consisting of an initial log-amplitude spectrum, an attenuation (1/Q) profile, and a log-amplitude scaling profile, equation (6) provides a mechanism to forward model log-amplitude spectra as waves propagate into the earth and are attenuated.

Inversion Strategies

An inversion is performed to arrive at an optimized estimate for the Q profile. In general, the inversion involves finding the attenuation (1/Q) profile that is best able to match the measured log-amplitude spectra. Modeling with equation (6) can be represented as the matrix equation, d=Fm, where the data vector, d, contains log-spectral estimates $B(\omega, \tau)$, and the model vector m contains the attenuation profile $Q^{-1}(\tau)$, log-amplitude scalars, $B(\tau)$, and initial log-amplitude spectrum, $B_0(\omega)$. F represent the process of computing the effects of attenuation via the integral, and combining them with the log-amplitude scale factors, and the initial log-amplitude spectrum.

The model is sought which minimizes an objective function, E, where E is defined by:

$$E = (d-Fm)^T W^2 (d-Fm) + m^T A^T A m \quad (8)$$

W represents a weighting function and A is an operator designed to improve the stability of the process. Both of these will be described in further detail below.

The first term ensures the predicted data matches the observed data, and the second term stabilizes the system by placing additional constraints on the model parameters.

This system can be solved in a number of ways: either directly by matrix inversion techniques, or approximately via sparse linear solver techniques. However, solving this system may be problematic for a number of reasons. Firstly, it is similar to Dix's velocity inversion in that an estimate is made of an interval property from a time-averaged measurement. As such, instability can arise. Secondly, non-physical negative values for apparent interval-Q can arise due to interference effects. Thirdly, errors in log-amplitude spectra are non-Gaussian, and special care needs to be taken with weights to ensure results are not biased. Successful inversion requires carefully incorporating constraints that reflect prior beliefs, and weights that reflect the levels of signal and noise present in the data.

Constraints and Weights

The weighting function $W^2$ allows noise levels that may vary as a function of frequency and depth to be balanced. For Gaussian noise, Bayes' theorem provides that $W^2$ be replaced by the inverse of the data covariance matrix. However, the noise in log-spectral estimates is non-Gaussian and impossible to model with a simple covariance matrix. The important features of how noise manifests itself in the log-amplitude domain are captured with a simple and pragmatic parameterization. A reasonable starting assumption is that complex spectral estimates are corrupted by additive zero-mean noise, d=s+n, where s is signal and n is noise. The additive zero-mean noise d becomes additive noise of the form log |1+n/s| in log-spectral estimates. For frequency components with |s|>>|n|, this means that the variance of the noise will be equal to $E(n^2/s^2)$. Unfortunately, for |s|<|n|, this analysis does not hold, and a systematic bias appears: observed log-spectral data typically hit a noise-floor at high frequencies, while the predicted log-spectral data can become increasingly negative without limit. Consequently, at high frequencies, predicted amplitudes are always smaller than the observations.

In a preferred embodiment of the invention, a weighting function is used which is defined by $W(\omega, \tau) = A(\omega, \tau) - \check{n}$ for $A(\omega, \tau) > \check{n}$ and zero otherwise. It varies continuously between being approximately proportional to the signal if s>>n, and zero for components with s<nn. The noise-level, $\check{n}$, is a parameter that needs to be estimated by examining the noise-floor in log-amplitude spectra. The stability operator A helps stabilize the inversion by reducing the degrees of freedom in the model space. The exact nature of stability operator A depends on the problem being solved, but it typically involves penalizing the first derivative of $Q^{-1}(\tau)$ and $\beta(\tau)$. It also includes a trade-off parameter that determines the relative weights placed on the two terms in equation (8). There is no particular method of determining the best value for the trade-off parameter. Several values should be tested, along with various windowing parameters, to understand the stability of the result and the implied trade-off between resolution and accuracy for the particular dataset being analyzed.

Negative Attenuation

Negative attenuation corresponds to amplitude growth as the wave propagates. Unless Q compensation has already been applied to the data, it is clearly a non-physical phenomenon, resulting from noise in the system. Negative Q values can be avoided by making the change of variables $Q = e^y$ in equation (6), and solving for y rather than $Q^{-1}$. The change of variables makes the problem non-linear, and the resulting system is solved with an iterative Gauss-Newton approach. Constraints on $Q^{-1}$ can be used as constraints on log Q, except they need to be interpreted slightly differently: for example, penalizing the fractional change in $Q^{-1}$, rather than the change itself.

An alternative approach is to allow both positive and negative values for Q during the inversion, and eliminate any negative Qs after the fact. However, this needs to be done in a way that is consistent with, and does not distort, the positive Q estimates. The effect of attenuation described by equation (6) is proportional to the integral of $Q^{-1}$ along the propagation path:

$$f = (\tau) = \int_{\tau' = \tau_0}^{T} Q^{-1}(\tau') d\tau' \quad (9)$$

This should be a monotonically increasing function of $\tau$, however, negative Qs cause the function to decrease with $\tau$. It is important in editing interval-Qs, whether to remove negative values or just smoothing the estimates, that the implied f(x) is conserved where possible.

Figure 1:
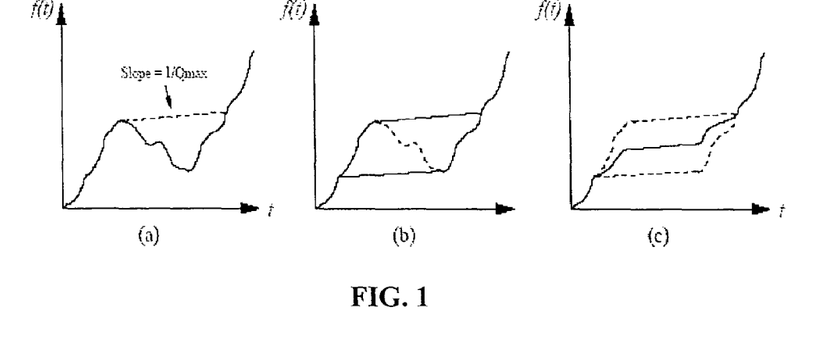
FIG. 1 shows a process for removing negative Q values: (a) first integrate $Q^{(-1)}$ to give $f(\tau)$ and clip its gradient in a causal direction; (b) then repeat in an anticausal direction; (c); finally, average the two clipped functions, and differentiate to give an all positive $Q^{-1}$ profile that preserves total attenuation.

The preferred approach used to eliminate negative Qs is illustrated in FIG. 1. First, as seen in FIG. 1 (a), $Q^{-1}$ is integrated to give f($\tau$) and its gradient is clipped in a causal direction. This process is repeated in an anticausal direction in FIG. 1(b). Finally, the two clipped functions are averaged and differentiated to give an all positive $Q^{-1}$ profile that preserves total attenuation.

Figure 2:
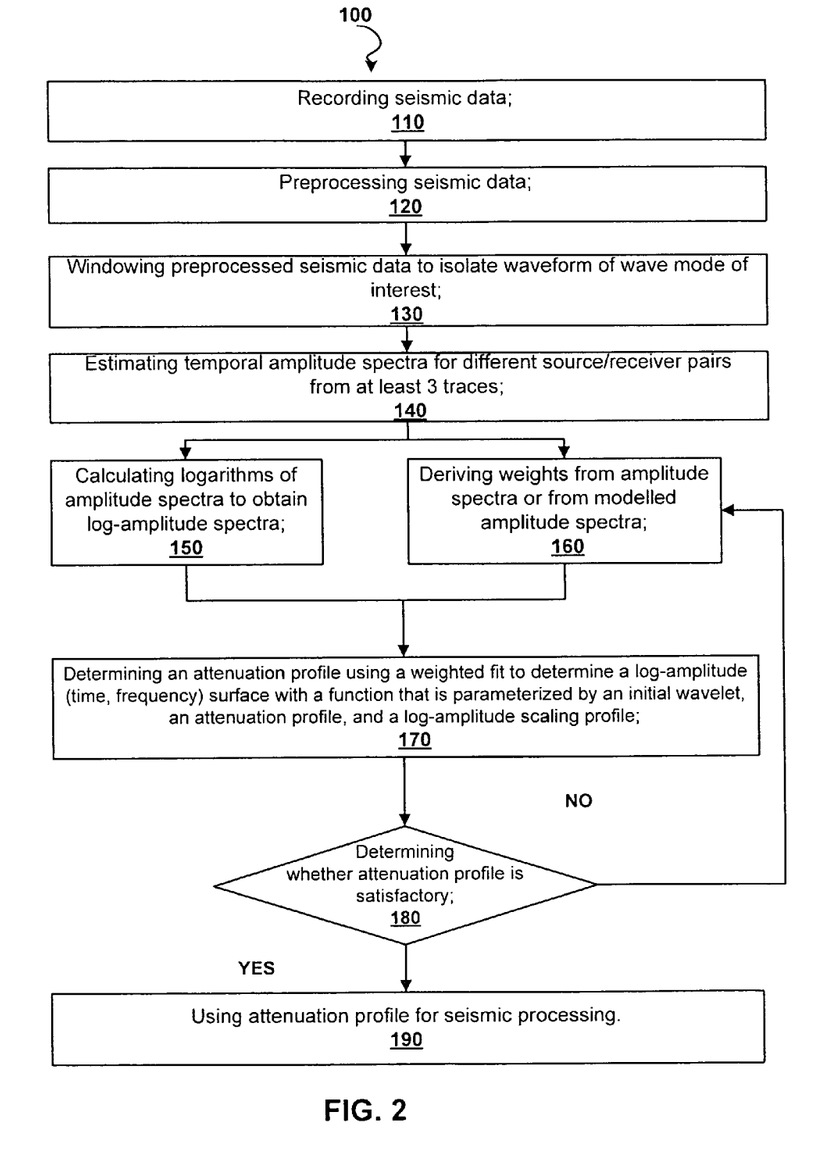
FIG. 2 depicts a flowchart for determining an attenuation (1/Q) profile from a VSP (vertical seismic profile)
Figure 3:
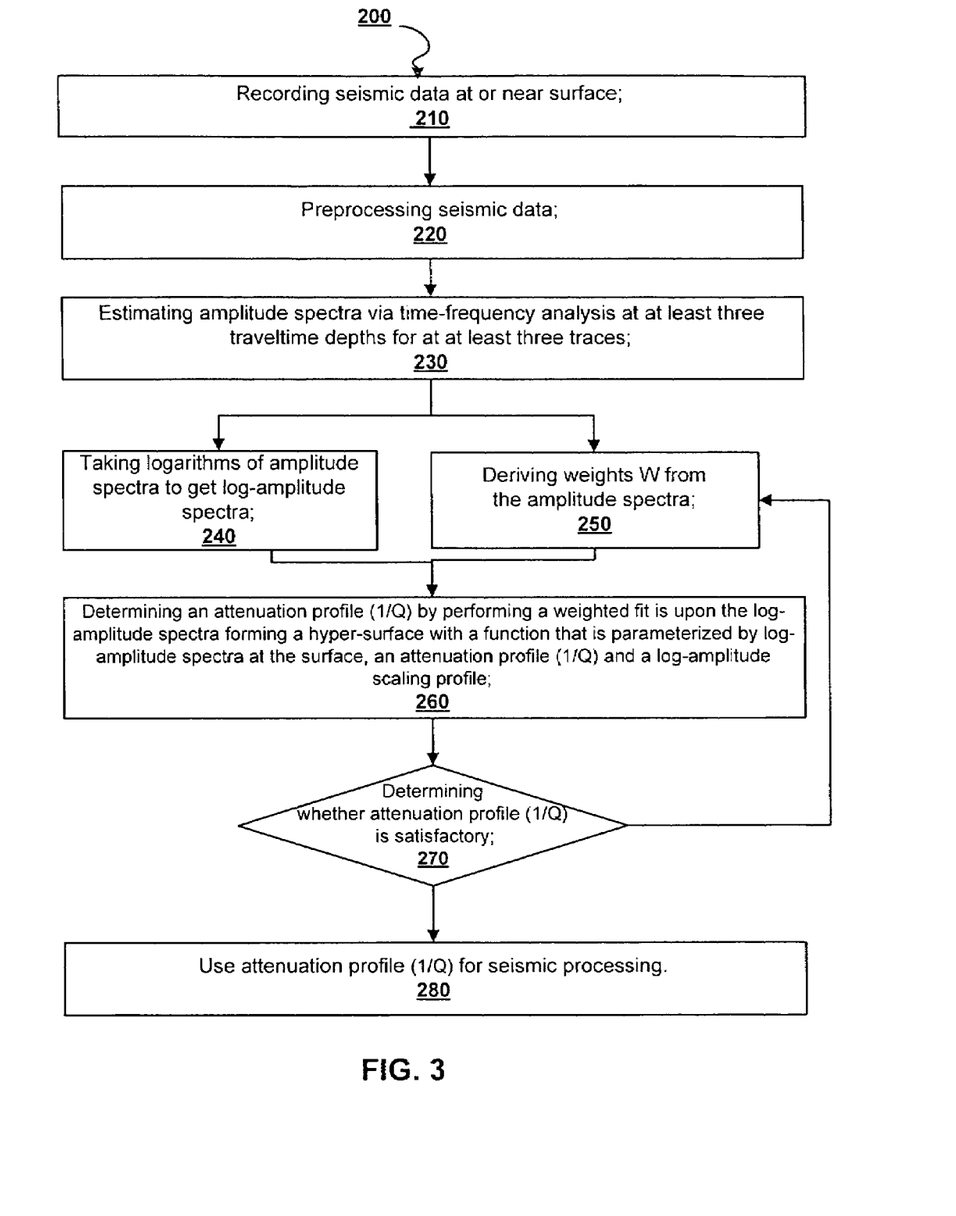
FIG. 3 shows a flowchart for determining an attenuation (1/Q) profile from surface seismic reflection data.

III. Exemplary Implementation Steps for Carrying Out the Attenuation Estimating Algorithm First, a process for determining interval values of the seismic quality factor, Q, using VSP's will be described and then a similar process for surface seismic reflection data. FIG. 2 shows a flowchart 100 for use with VSP data and FIG. 3 show a flowchart for use with surface seismic reflection data.

A first step 110 is to record a vertical seismic profile (VSP). Numerous sources and receivers are used to attain this seismic data. Next, the raw seismic data is appropriately preprocessed in step 120. By way of example and not limitation, this preprocessing may include source/receiver compensation, time-alignment and removal of backscattered energy. This processed data may then be windowed in step 130 to isolate waveform of wave mode of interest (P, SH, SV etc.) at different traveltime depths.

In step 140, estimates are made of the temporal amplitude spectra for different source/receiver pairs (e.g. by discrete Fourier transform, multi-window, maximum entropy etc. techniques) from at least 3 traces.

The logarithms of these estimated amplitude spectra are then calculated in step 150, resulting in log-amplitude spectra. These log-amplitude spectra correspond to the data d from equation (8). In step 160, weights W are derived from the estimated amplitude spectra from step 140. The weights W correspond to W in equation (8).

A weighted fit is used in step 170 to determine a log-amplitude (time, frequency) surface with a function that is parameterized by an initial wavelet, an attenuation profile, and a log-amplitude scaling profile. Additional constraints can be applied either explicitly in the fit (e.g. by penalizing the variability of a profile) and/or through a naturally smooth parameterization (e.g. a coarse spline parameterization). As a result, an attenuation (1/Q) profile is determined for the seismic interval.

In step 180, a determination is made as to whether the attenuation (1/Q) profile is satisfactory. This may be accomplished by inspecting the attenuation (1/Q) profile. If not satisfactory, then weights in step 160 can be recalculated based on amplitudes predicted with the current attenuation (1/Q) profile, When the attenuation (1/Q) profile is satisfactory, then the current attenuation (1/Q) profile may be used in step 190 for further seismic processing operation, as is well known to those skilled in the art.

The present invention may also be used with surface seismic reflection data (3D/4D), as shown in FIG. 3 for flowchart 200. The first step 210 is again to obtain raw seismic data. In this case the data is preferably reflection data recorded at or near the surface. This reflection data may be preprocessed in step 220, as needed.

In step 230, estimates are made of amplitude spectra via time-frequency analysis methods at at least three traveltime depths (via wavelets, windowed FFTs etc.) for a plurality of traces. The logarithms of the amplitude spectra are taken in step 240. Weights W are derived from the amplitude spectra in step 250.

In step 260, a weighted fit is performed upon the log-amplitude (midpoint, time/depth, offset/angle, frequency) forming a hyper-surface with a function that is parameterized by log-amplitude spectra at the surface, an attenuation (1/Q) profile (or volume), and a log-amplitude scaling profile (or volume). Additional constraints can be applied either explicitly in the fit (e.g. by penalizing the variability of a profile or volume) and/or through a naturally smooth parameterization (e.g. via splines). In step 270, a determination is made as to whether the attenuation (1/Q) profile is satisfactory. If not, the new weights are again calculated in step 250 based on amplitudes predicted with the current attenuation (1/Q) profile, and a new attenuation profile is calculated in step 260. If acceptable, then in step 280, the attenuation (1/Q) profile or the absolute-scaling profile may be used for seismic processing or reservoir characterization purposes.

The present invention also includes apparatus or computer readable media carrying instruction for performing the aforementioned methods of estimating attenuation (1/Q) profiles.

IV. Synthetic Data Tests

Figure 4:
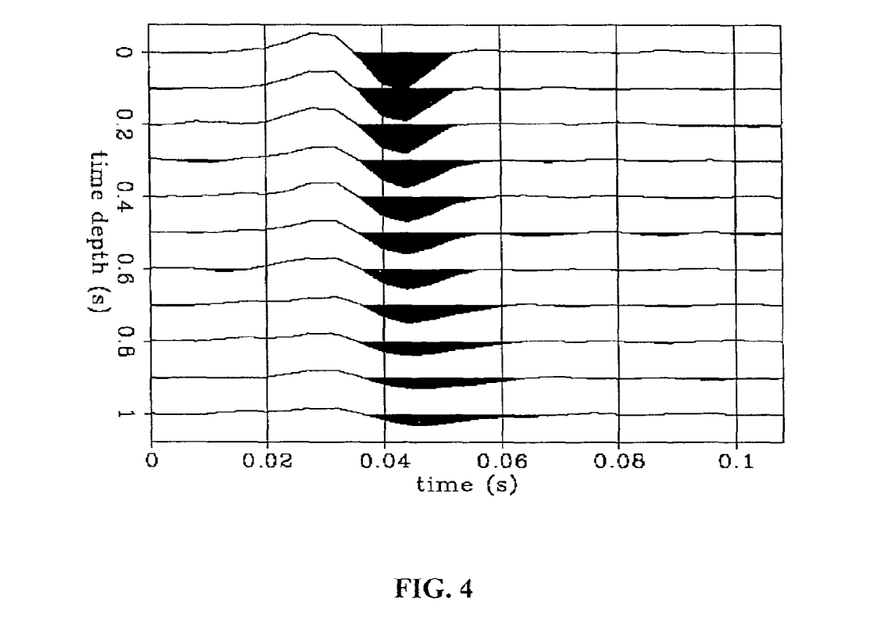
FIG. 4 illustrates time-varying wavelets which were created from a depth-variable frequency-independent Q profile with random noise added, and a bandpass filter applied.
Figure 5A:
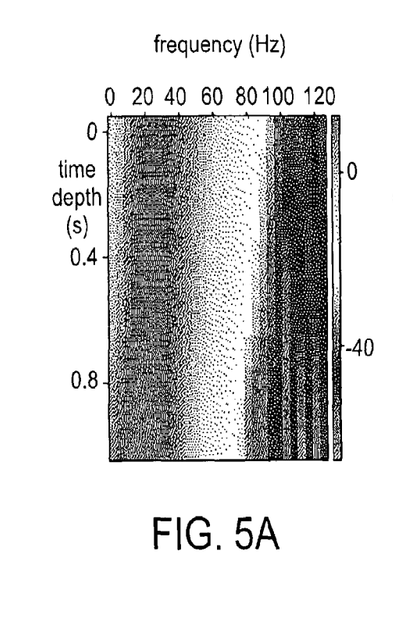
FIG. 5 shows graphs of an unconstrained inversion of noise-free synthetic VSP data: (a) input spectra in dB, (b) modeled spectra, (c) residuals, and (d) estimated (solid) and true (dashed) attenuation models.
Figure 5B:
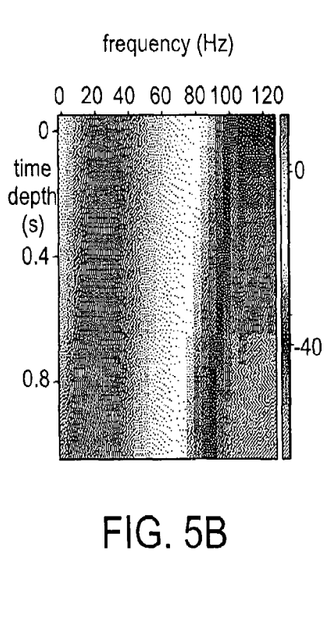
Figure 5C:
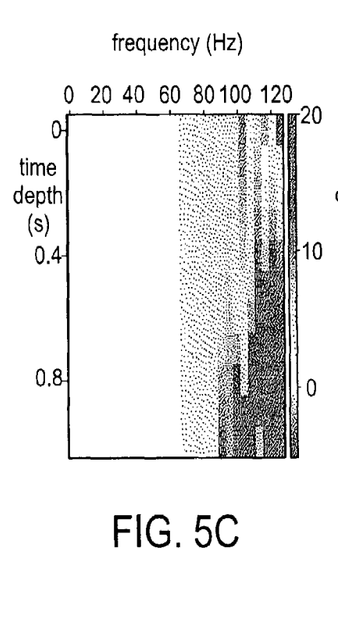
Figure 5D:
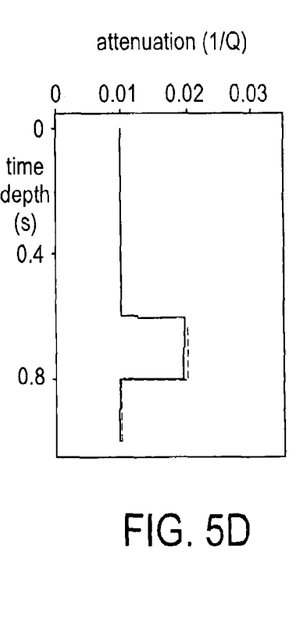
Figure 6A:
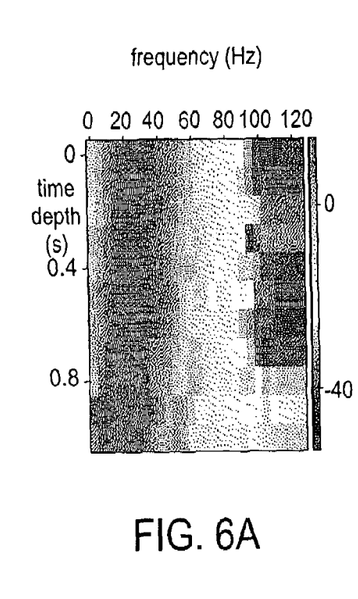
FIG. 6 illustrates graphs of unconstrained inversion of synthetic data with noise: (a) observed spectra in dB, (b) modeled spectra, (c) residuals, and (d) estimated (solid) and true (dashed) attenuation models.
Figure 6B:
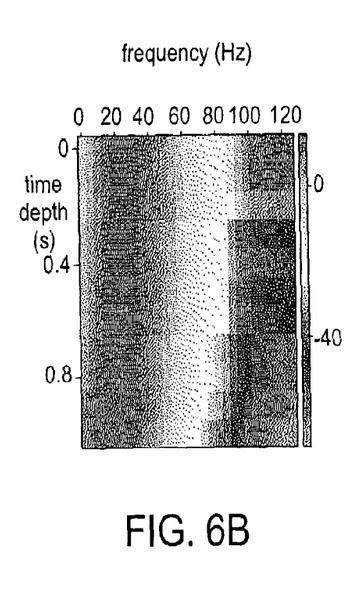
Figure 6C:
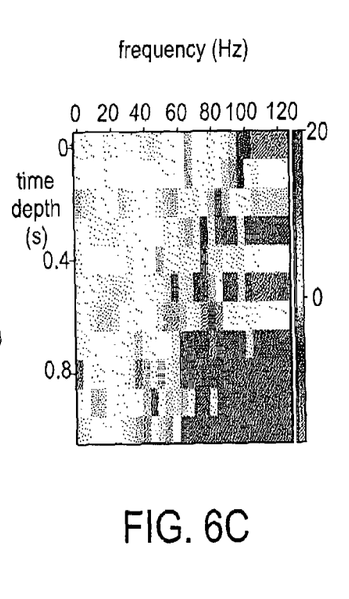
Figure 6D:
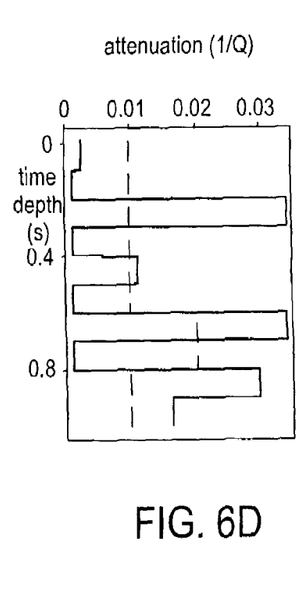
Figure 7A:
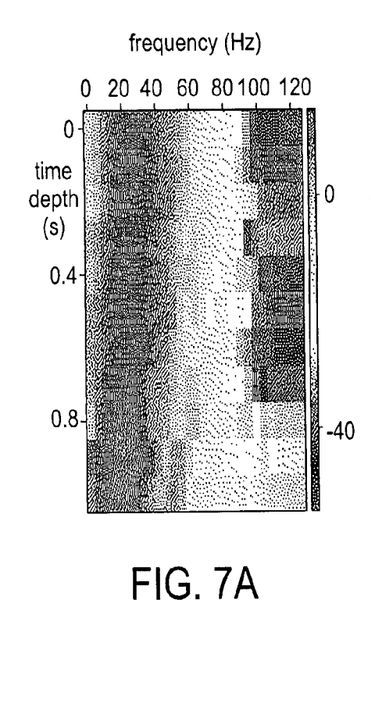
FIG. 7 depicts graphs of constrained inversion of synthetic data with noise: (a) observed spectra in dB, (b) modeled spectra, (c) residuals, and (d) estimated (solid) and true (dashed) attenuation models.
Figure 7B:
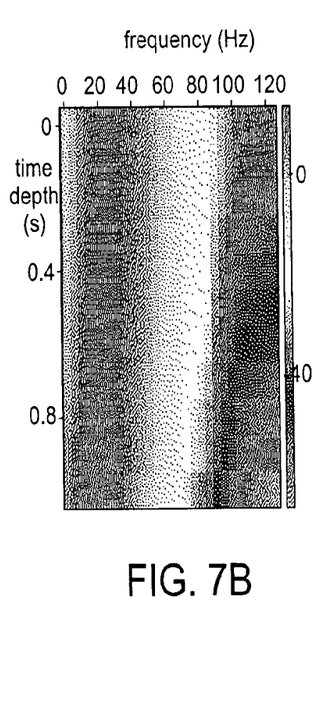
Figure 7C:
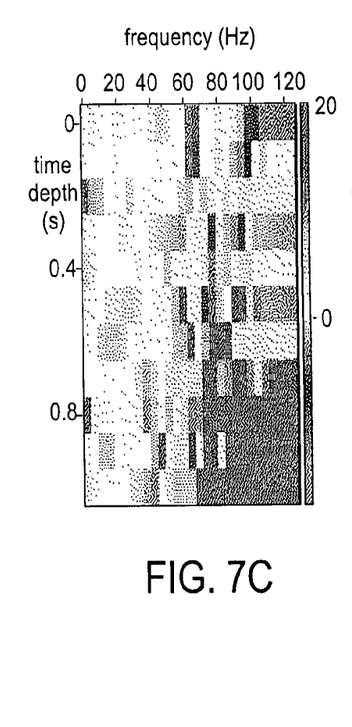
Figure 7D:
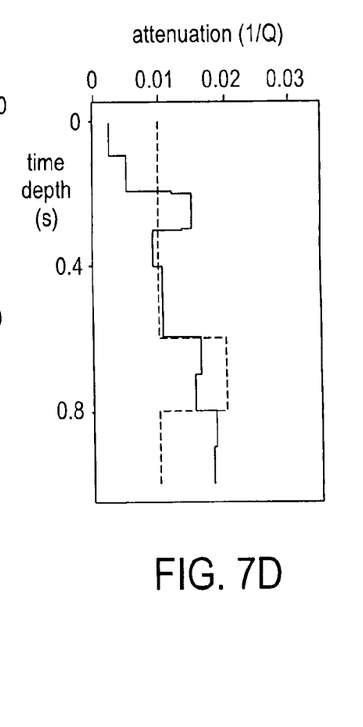
Figure 8A:
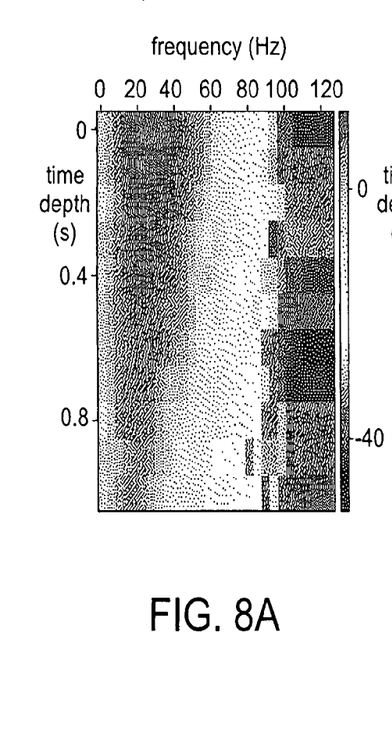
FIG. 8 shows graphs of constrained inversion of noisy synthetic data including absolute amplitudes: (a) observed spectra, (b) modeled spectra, (c) residuals, and (d) estimated (solid) and true (dashed) attenuation models.
Figure 8B:
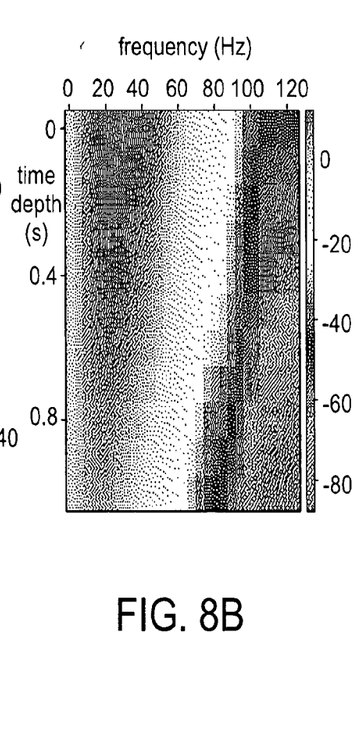
Figure 8C:
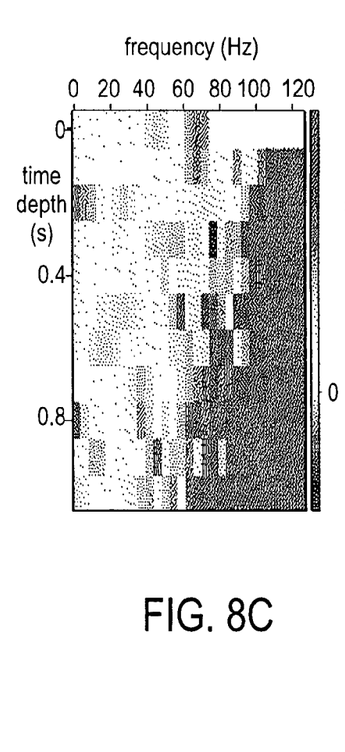
Figure 8D:
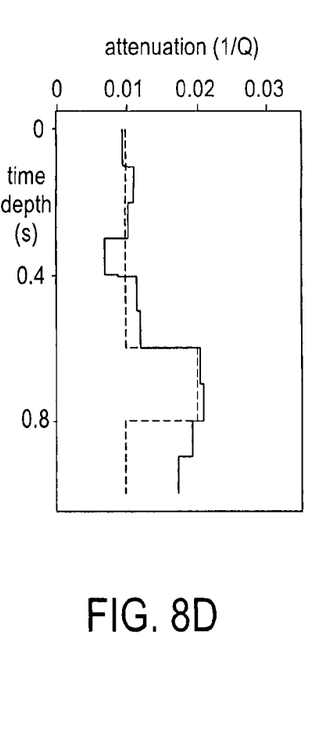

To illustrate the effectiveness of the above method shown in flowchart 100, synthetic wavelets were generated with a simple Q model consisting of a Q=50 layer embedded in a Q=100 background. A small amount of random noise was added and low-passed filtered, and/or normalized wavelet amplitudes to unit maximum amplitude. FIG. 4 illustrates time-varying wavelets created from a depth-variable frequency-independent Q profile with random noise added, and a bandpass filter applied. FIG. 4 shows wavelets after adding the noise, but without normalizing the amplitudes.

FIGS. 5 through 8 illustrate the inversion results. Even after trace-normalization, the interval attenuation (FIG. 5) can be successfully recovered in the noise-free case. Random noise makes things more difficult, however. FIGS. 6 and 7 illustrate inversion results on the noisy data without and with $d/d_T$ constraints on $Q^{-1}$ and $\beta$. Clearly the constraints are necessary to stabilize the inversion, and although it is not a perfect result, the constrained result does resolve the higher attenuation lower in the profile. FIG. 8 is an inversion of the noisy data without normalized amplitudes. The relative amplitude between waveforms now provides an additional constraint, which improves the result over FIG. 7.

Conclusions

Estimating interval Q values from seismic data is a difficult problem that is in some aspects similar to estimating interval velocities from traveltimes. A tomographic extension is introduced to the standard spectral ratio method that allows interval Q estimates while remaining insensitive to absolute amplitudes.

This novel approach generalizes this to fit a surface (or hyper-surface) to many log-spectra simultaneously. In one example including vertical VSPs, the data consists of depth-variable spectra, and the fitting surface can be parameterized by an initial wavelet (function of frequency), an attenuation (1/Q) profile (function of depth), and a profile that captures the absolute scaling of the waveforms (function of depth). The fit is best in a weighted least squares sense, where weights are constructed from amplitude spectral estimates to be inversely proportional to the noise level.

The approach can be applied to estimate attenuation from VSPs, and surface seismic volumes, with and without well control. Depending on the application, the model components can be parameterized, by way of example and not limitation, as functions of frequency, depth, space, offset (or angle), and can have additional (smoothness-type) constraints that dampen the system.

While in the foregoing specification this invention has been described in relation to certain preferred embodiments thereof, and many details have been set forth for purposes of illustration, it will be apparent to those skilled in the art that the invention is susceptible to alteration and that certain other details described herein can vary considerably without departing from the basic principles of the invention.

What is claimed is:

1. A method for determining interval Values of seismic quality factor Q, the method comprising the steps of:
   (a) recording a vertical seismic profile (VSP) data for a subterranean region including at least three. traces at different receiver depths;
   (b) performing Preprocessing on the VSP data;
   (c) windowing the preprocessed VSP data to isolate wave mode of interest at different receiver depths;
   (d) estimating at least three temporal amplitude spectra from the windowed at least three traces;
   (e) taking logarithms of the at least three amplitude spectra to produce at least three log-amplitude spectra;
   (f) deriving weights from the at least three amplitude spectra;
   (g) determining interval values of seismic quality factor Q by performing a weighted fit to the at least three log-amplitude spectra with a function that is parameterized by an initial wavelet, an attenuation (1/Q) profile, and an absolute-scaling profile; and
   (h) utilizing the interval values of seismic quality factor Q to determine characteristics of the subterranean region.

2. The method of claim 1 wherein:
the step of estimating the at least three temporal amplitude spectra is performed using a discrete Fourier transform technique.

3. The method of claim 1 wherein:
the step of estimating the at least three temporal amplitude spectra is performed using a multi-window technique.

4. The method of claim 1 wherein:
the step of estimating the at least three temporal amplitude spectra is performed using a maximum entropy technique.

5. The method of claim 1 wherein:
constraints are applied using at least one of explicitly in the fit and through a naturally smooth parameterization.

6. The method of claim 5 wherein:
the constraints are applied explicitly in the fit.

7. The method of claim 6 wherein:
the constraints are applied explicitly in the fit by penalizing the variability of a profile.

8. The method of claim 5 wherein:
the constraints are applied through a naturally smooth parameterization.

9. The method of claim 1 wherein: the step of deriving weights from at least three amplitude spectra is performed using amplitude spectra that are calculated from the current attenuation (1/Q) profile.

10. The method of claim 1 wherein:
the initial wavelet is also a function of space.

11. The method of claim 1 wherein:
the initial wavelet is also a function of offset/angle.

12. The method of claim 1 wherein:
the attenuation (1/Q) profile is a function of one of space and offset/angle.

13. The method of claim 1 Wherein: the absolute-scaling profile is one of at least space and offset/angle.

14. A method for determining interval values. of seismic quality factor, Q, from surface reflection seismic data for a subterranean region, the method comprising:
   (a) recording reflection seismic data including a plurality of traces;
   (b) preprocessing on the reflection seismic data to get enhanced reflection seismic data;
   (c) estimating amplitude spectra via time-frequency analysis methods at least three depths;
   (d) taking logarithms of amplitude spectra to get log-amplitude spectra;
   (e) deriving weights from the amplitude spectra;
   (f) performing a weighted fit to the log-amplitude spectra with a function that is parameterized by initial wavelets, an attenuation (1/Q) profile, and an absolute-scaling profile to arrive at interval values of seismic quality factor, Q; and
   (g) utilizing the interval values of seismic quality factor, Q, to determine characteristics of the subterranean region.

15. The method of claim 14 wherein:
the estimating of the amplitude spectra includes using a wavelet technique.

16. The method of claim 14 wherein: the estimating of the amplitude spectra includes using a windowed fast Fourier transform (FET) technique.

17. The method of claim 14 wherein: the step of deriving weights from at least three amplitude spectra is performed using amplitude spectra that are calculated from the current attenuation (1/Q) profile.

* * * * *